W. Bellamy.
Handles for Metal Tea-Pots &c.
N° 73567. Patented Jan. 21, 1868.
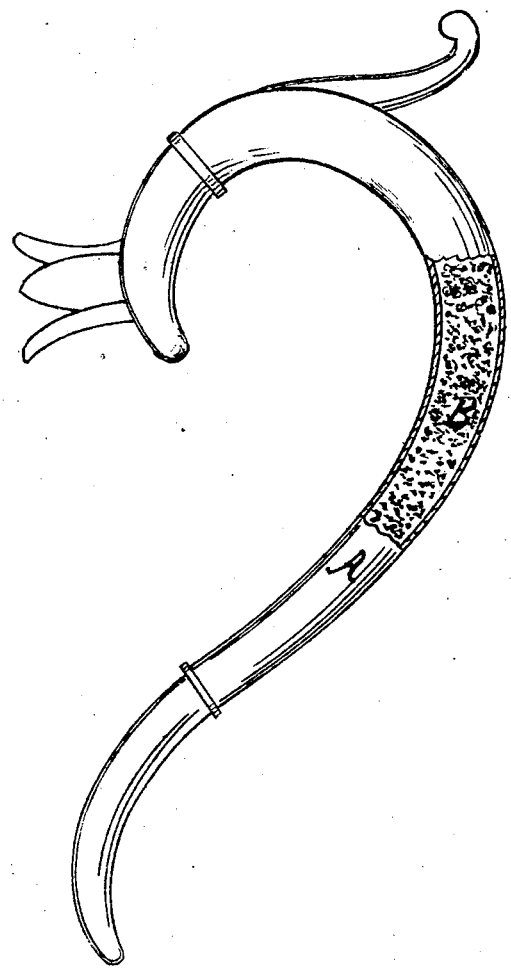
Witnesses.
W. Irwin
F. Blackley
Inventor:
Wm Bellamy
Per Munn & Co
Attorneys.

United States Patent Office.

WILLIAM BELLAMY, OF NEWARK, NEW JERSEY.

Letters Patent No. 73,567, dated January 21, 1868.

IMPROVEMENT IN THE CONSTRUCTION OF HANDLES FOR METAL TEA AND COFFEE-POTS.

The Schedule referred to in these Letters Patent and making part of the same.

TO ALL WHOM IT MAY CONCERN:

Be it known that I, WILLIAM BELLAMY, of Newark, in the county of Essex, and State of New Jersey, have invented a new and useful Improvement in Handles for Metal Tea and Coffee-Pots; and that the following description, taken in connection with the accompanying drawing, hereinafter referred to, forms a full and exact specification of the same, wherein I have set forth the nature and principles of my said improvement, by which my invention may be distinguished from all others of a similar class, together with such parts as I claim, and desire to have secured to me by Letters Patent.

The object of this invention is to render a handle for a metal coffee or tea-pot a poor conductor of heat, so that it will not become sufficiently heated by the contents of the pot to make it unpleasant to grasp with the hand. Various plans have been devised to effect this object, the most common of which is to insulate, by means of bone, pearl, or other non-conducting substances, the main portion of the handle which is grasped by the hand, from the end portions which are connected to the pot, but at best only a partial insulation is effected in this way, as the bolts which connect the two parts of the handle together serve as a means for communicating considerable heat to the main portion which is grasped by the hand.

My invention consists in having the handle hollow or tubular, and filling it with plaster of Paris, which will keep the handle in a cool state. This substance is a very poor conductor of heat, and contains a great deal of moisture, which is evolved when it is subjected to heat; the thin metal handle being consequently kept cool thereby.

The accompanying drawing represents a side view of my invention, a portion of the handle being broken away in order to show the filling.

The handle A is hollow or tubular, and constructed of any suitable metal, and B is the plaster of Paris filling. This filling keeps the handle cool, or will not allow it to heat sufficiently from the contents of the pot to render it unpleasant to handle.

This invention has been practically tested, and found to answer an admirable purpose, and will not augment the cost of the manufacture of tea and coffee-pots.

Having thus described my invention, I claim as new, and desire to secure by Letters Patent—

A tubular metal handle filled with plaster of Paris for metal tea and coffee-pots, substantially as and for the purpose set forth.

WILLIAM BELLAMY.

Witnesses:
  E. P. HIGGINS,
  JOSEPH DUTTON.